United States Patent
Craft et al.

(10) Patent No.: US 9,413,788 B1
(45) Date of Patent: Aug. 9, 2016

(54) TCP OFFLOAD SEND OPTIMIZATION

(71) Applicants: Peter K Craft, San Francisco, CA (US);
Clive M Philbrick, San Jose, CA (US);
Daryl D Starr, Milpitas, CA (US)

(72) Inventors: Peter K Craft, San Francisco, CA (US);
Clive M Philbrick, San Jose, CA (US);
Daryl D Starr, Milpitas, CA (US)

(73) Assignee: Alacritech, Inc., San Jose, CA (US)

( * ) Notice: Subject to any disclaimer, the term of this patent is extended or adjusted under 35 U.S.C. 154(b) by 686 days.

(21) Appl. No.: 13/716,635

(22) Filed: Dec. 17, 2012

Related U.S. Application Data (62) Division of application No. 12/504,021, filed on Jul. 16, 2009, now Pat. No. 8,341,286.

(60) Provisional application No. 61/085,352, filed on Jul. 31, 2008.

(51) Int. Cl.
*H04L 29/06* (2006.01)

(52) U.S. Cl.
CPC .................................. *H04L 65/1013* (2013.01)

(58) Field of Classification Search
None
See application file for complete search history.

(56) References Cited

U.S. PATENT DOCUMENTS

| | | | |
|---|---|---|---|
| 4,366,538 A | 12/1982 | Johnson et al. | 364/200 |
| 4,485,455 A | 11/1984 | Boone et al. | 364/900 |
| 4,485,460 A | 11/1984 | Stambaugh | 365/203 |
| 4,589,063 A | 5/1986 | Shah et al. | 710/8 |
| 4,700,185 A | 10/1987 | Balph et al. | 340/825.5 |
| 4,991,133 A | 2/1991 | Davis et al. | 364/900 |
| 5,056,058 A | 10/1991 | Hirata et al. | 709/230 |
| 5,058,110 A | 10/1991 | Beach et al. | 370/85.6 |
| 5,097,442 A | 3/1992 | Ward et al. | 365/78 |
| 5,129,093 A | 7/1992 | Muramatsu et al. | |
| 5,163,131 A | 11/1992 | Row et al. | 395/200 |

(Continued)

FOREIGN PATENT DOCUMENTS

| | | |
|---|---|---|
| WO | WO 98/19412 | 5/1998 |
| WO | WO 98/50852 | 11/1998 |

(Continued)

OTHER PUBLICATIONS

Internet pages entitled "Hardware Assisted Protocol Processing", (which Eugene Feinber is working on), 1 page, printed Nov. 25, 1998.

(Continued)

*Primary Examiner* — Natisha Cox
(74) *Attorney, Agent, or Firm* — Mark Lauer; Silicon Edge Law Group LLP (57) ABSTRACT

A host with a network interface that offloads a TCP connection is disclosed in which the notification that relatively small data transmit commands have completed is batched whereas the notification that relatively large data transmit commands have completed are not batched. The notification that data transmit commands have completed may be intrinsically modulated by the size and frequency of the commands and the processing of the data transfer by the TCP connection. One embodiment involves a method comprising: running an application on a computer having a network interface; running, on the network interface, a TCP connection for the application; providing, by the computer to the network interface, a command to send data from the application; updating, by the network interface, a SndUna value for the TCP connection; and providing, by the network interface to the computer, the SndUna value, thereby indicating to the computer that the command has been completed.

15 Claims, 3 Drawing Sheets

(56) References Cited

U.S. PATENT DOCUMENTS

| | | | |
|---|---|---|---|
| 5,212,778 A | 5/1993 | Dally et al. | 395/400 |
| 5,274,768 A | 12/1993 | Traw et al. | |
| 5,280,477 A | 1/1994 | Trapp | 370/85.1 |
| 5,281,963 A | 1/1994 | Ishikawa et al. | |
| 5,289,580 A | 2/1994 | Latif et al. | 395/275 |
| 5,303,344 A | 4/1994 | Yokoyama et al. | 395/200 |
| 5,412,782 A | 5/1995 | Hausman et al. | 395/250 |
| 5,418,912 A | 5/1995 | Christenson | 395/200 |
| 5,448,566 A | 9/1995 | Richter et al. | 370/94.1 |
| 5,485,455 A | 1/1996 | Dobbins et al. | |
| 5,485,460 A | 1/1996 | Schrier et al. | |
| 5,485,579 A | 1/1996 | Hitz et al. | 395/200.12 |
| 5,506,966 A | 4/1996 | Ban | 395/250 |
| 5,511,169 A | 4/1996 | Suda | 395/280 |
| 5,517,668 A | 5/1996 | Szwerinski et al. | 395/800 |
| 5,524,250 A | 6/1996 | Chesson et al. | 395/775 |
| 5,535,375 A | 7/1996 | Eshel et al. | 391/500 |
| 5,548,730 A | 8/1996 | Young et al. | 395/280 |
| 5,553,241 A | 9/1996 | Shirakihara | |
| 5,566,170 A | 10/1996 | Bakke et al. | 370/60 |
| 5,574,919 A | 11/1996 | Netravali et al. | 395/561 |
| 5,588,121 A | 12/1996 | Reddin et al. | |
| 5,590,328 A | 12/1996 | Seno et al. | 395/675 |
| 5,592,622 A | 1/1997 | Isfeld et al. | 395/200.02 |
| 5,596,574 A | 1/1997 | Perlman et al. | |
| 5,598,410 A | 1/1997 | Stone | 370/469 |
| 5,619,650 A | 4/1997 | Bach et al. | 395/200.01 |
| 5,629,933 A | 5/1997 | Delp et al. | 370/411 |
| 5,633,780 A | 5/1997 | Cronin et al. | 361/220 |
| 5,634,099 A | 5/1997 | Andrews et al. | 395/200.07 |
| 5,634,127 A | 5/1997 | Cloud et al. | 395/680 |
| 5,642,482 A | 6/1997 | Pardillos | 395/200.2 |
| 5,664,114 A | 9/1997 | Krech, Jr. et al. | 395/200.64 |
| 5,671,355 A | 9/1997 | Collins | 395/200.2 |
| 5,678,060 A | 10/1997 | Yokoyama et al. | 709/212 |
| 5,682,534 A | 10/1997 | Kapoor et al. | 395/684 |
| 5,684,954 A | 11/1997 | Kaiserswerth et al. | |
| 5,692,130 A | 11/1997 | Shobu et al. | 395/200.12 |
| 5,699,317 A | 12/1997 | Sartore et al. | 395/230.06 |
| 5,699,350 A | 12/1997 | Kraslavsky | 370/254 |
| 5,701,434 A | 12/1997 | Nakagawa | 395/484 |
| 5,701,516 A | 12/1997 | Cheng et al. | 395/842 |
| 5,706,514 A | 1/1998 | Bonola | |
| 5,727,142 A | 3/1998 | Chen | 395/181 |
| 5,742,765 A | 4/1998 | Wong et al. | 395/200 |
| 5,749,095 A | 5/1998 | Hagersten | 711/141 |
| 5,751,715 A | 5/1998 | Chan et al. | 370/455 |
| 5,751,723 A | 5/1998 | Vanden Heuvel et al. | |
| 5,752,078 A | 5/1998 | Delp et al. | 395/827 |
| 5,758,084 A | 5/1998 | Silverstein et al. | 395/200.58 |
| 5,758,089 A | 5/1998 | Gentry et al. | 395/200.64 |
| 5,758,186 A | 5/1998 | Hamilton et al. | 395/831 |
| 5,758,194 A | 5/1998 | Kuzma | 395/886 |
| 5,768,618 A | 6/1998 | Erickson et al. | 395/829 |
| 5,771,349 A | 6/1998 | Picazo, Jr. et al. | 395/188.01 |
| 5,774,660 A | 6/1998 | Brendel et al. | 395/200.31 |
| 5,778,013 A | 7/1998 | Jedwab | 714/807 |
| 5,778,419 A | 7/1998 | Hansen et al. | 711/112 |
| 5,790,804 A | 8/1998 | Osborne | 709/245 |
| 5,794,061 A | 8/1998 | Hansen et al. | 395/800.01 |
| 5,799,150 A | 8/1998 | Hamilton et al. | |
| 5,802,258 A | 9/1998 | Chen | 395/182.08 |
| 5,802,580 A | 9/1998 | McAlpine | 711/149 |
| 5,809,328 A | 9/1998 | Nogales et al. | 395/825 |
| 5,809,527 A | 9/1998 | Cooper et al. | 711/133 |
| 5,812,775 A | 9/1998 | Van Seters et al. | 395/200.43 |
| 5,815,646 A | 9/1998 | Purcell et al. | 395/163 |
| 5,819,111 A | 10/1998 | Davies et al. | |
| 5,828,835 A | 10/1998 | Isfeld et al. | 395/200.3 |
| 5,848,293 A | 12/1998 | Gentry et al. | 395/825 |
| 5,870,394 A | 2/1999 | Oprea | |
| 5,872,919 A | 2/1999 | Wakeland et al. | 395/200 |
| 5,878,225 A | 3/1999 | Bilansky et al. | 395/200.57 |
| 5,878,227 A | 3/1999 | Wade et al. | |
| 5,892,903 A | 4/1999 | Klaus | 395/187.01 |
| 5,898,713 A | 4/1999 | Melzer et al. | 371/53 |
| 5,913,028 A | 6/1999 | Wang et al. | 395/200.33 |
| 5,915,094 A | 6/1999 | Kouloheris et al. | |
| 5,917,828 A | 6/1999 | Thompson | |
| 5,920,566 A | 7/1999 | Hendel et al. | 370/401 |
| 5,926,642 A | 7/1999 | Favor | |
| 5,930,830 A | 7/1999 | Mendelson et al. | 711/171 |
| 5,931,918 A | 8/1999 | Row et al. | 709/300 |
| 5,935,205 A | 8/1999 | Murayama et al. | 709/216 |
| 5,935,249 A | 8/1999 | Stern et al. | |
| 5,937,169 A | 8/1999 | Connery et al. | 395/200.8 |
| 5,941,969 A | 8/1999 | Ram et al. | 710/128 |
| 5,941,972 A | 8/1999 | Hoese et al. | 710/129 |
| 5,950,203 A | 9/1999 | Stakuis et al. | 707/10 |
| 5,963,876 A | 10/1999 | Manssen et al. | |
| 5,978,844 A | 11/1999 | Tsuchiya et al. | |
| 5,987,022 A | 11/1999 | Geiger et al. | 370/349 |
| 5,991,299 A | 11/1999 | Radogna et al. | 370/392 |
| 5,996,013 A | 11/1999 | Delp et al. | 709/226 |
| 5,996,024 A | 11/1999 | Blumenau | 709/301 |
| 6,005,849 A | 12/1999 | Roach et al. | 370/276 |
| 6,009,478 A | 12/1999 | Panner et al. | 710/5 |
| 6,014,380 A | 1/2000 | Hendel et al. | |
| 6,014,557 A | 1/2000 | Morten et al. | |
| 6,016,513 A | 1/2000 | Lowe | 709/250 |
| 6,021,446 A | 2/2000 | Gentry et al. | 709/303 |
| 6,021,507 A | 2/2000 | Chen | 714/2 |
| 6,026,452 A | 2/2000 | Pitts | 710/56 |
| 6,034,963 A | 3/2000 | Minami et al. | 370/401 |
| 6,038,562 A | 3/2000 | Anjur et al. | 707/10 |
| 6,041,058 A | 3/2000 | Flanders et al. | 370/401 |
| 6,041,381 A | 3/2000 | Hoese | 710/129 |
| 6,044,438 A | 3/2000 | Olnowich | 711/130 |
| 6,047,323 A | 4/2000 | Krause | 709/227 |
| 6,047,356 A | 4/2000 | Anderson et al. | 711/129 |
| 6,049,528 A | 4/2000 | Hendel et al. | 370/235 |
| 6,057,863 A | 5/2000 | Olarig | 345/520 |
| 6,061,368 A | 5/2000 | Hitzelberger | 370/537 |
| 6,065,096 A | 5/2000 | Day et al. | 711/114 |
| 6,067,569 A | 5/2000 | Khaki et al. | 709/224 |
| 6,070,200 A | 5/2000 | Gates et al. | 710/20 |
| 6,078,564 A | 6/2000 | Lakshman et al. | |
| 6,078,733 A | 6/2000 | Osborne | 395/200.8 |
| 6,097,734 A | 8/2000 | Gotesman et al. | 370/474 |
| 6,101,555 A | 8/2000 | Goshey et al. | 709/321 |
| 6,111,673 A | 8/2000 | Chang et al. | 359/123 |
| 6,115,615 A | 9/2000 | Ota et al. | 455/553 |
| 6,122,670 A | 9/2000 | Bennett et al. | 709/236 |
| 6,141,701 A | 10/2000 | Whitney | 710/5 |
| 6,141,705 A | 10/2000 | Anand et al. | 710/15 |
| 6,145,017 A | 11/2000 | Ghaffari | 710/5 |
| 6,157,944 A | 12/2000 | Pedersen | 709/204 |
| 6,157,955 A | 12/2000 | Narad et al. | 709/228 |
| 6,172,980 B1 | 1/2001 | Flanders et al. | 370/401 |
| 6,173,333 B1 | 1/2001 | Jolitz et al. | |
| 6,181,705 B1 | 1/2001 | Branstad et al. | |
| 6,202,105 B1 | 3/2001 | Gates et al. | 710/20 |
| 6,219,693 B1 | 4/2001 | Napolitano et al. | |
| 6,223,242 B1 | 4/2001 | Sheafor et al. | 710/132 |
| 6,226,680 B1 | 5/2001 | Boucher et al. | 709/230 |
| 6,233,242 B1 | 5/2001 | Mayer et al. | |
| 6,243,667 B1 | 6/2001 | Kerr et al. | |
| 6,246,683 B1 | 6/2001 | Connery et al. | 370/392 |
| 6,247,060 B1 | 6/2001 | Boucher et al. | 709/238 |
| 6,279,051 B1 | 8/2001 | Gates et al. | 710/20 |
| 6,289,023 B1 | 9/2001 | Dowling et al. | 370/419 |
| 6,298,403 B1 | 10/2001 | Suri et al. | 710/100 |
| 6,324,649 B1 | 11/2001 | Eyres et al. | 713/202 |
| 6,334,153 B2 | 12/2001 | Boucher et al. | 709/230 |
| 6,343,345 B1 | 1/2002 | Hilla et al. | |
| 6,343,360 B1 | 1/2002 | Feinleib | 713/1 |
| 6,345,301 B1 | 2/2002 | Burns et al. | 709/230 |
| 6,345,302 B1 | 2/2002 | Bennett et al. | 709/236 |
| 6,356,951 B1 | 3/2002 | Gentry et al. | 709/250 |
| 6,370,599 B1 | 4/2002 | Anand et al. | 710/15 |
| 6,385,647 B1 | 5/2002 | Willis et al. | 709/217 |
| 6,389,468 B1 | 5/2002 | Muller et al. | 709/226 |
| 6,389,479 B1 | 5/2002 | Boucher | 709/243 |
| 6,393,487 B2 | 5/2002 | Boucher et al. | 709/238 |

(56) References Cited

U.S. PATENT DOCUMENTS

| | | |
|---|---|---|
| 6,418,169 B1 | 7/2002 | Datari |
| 6,421,742 B1 | 7/2002 | Tillier .................. 710/1 |
| 6,421,753 B1 | 7/2002 | Hoese et al. .......... 710/129 |
| 6,427,169 B1 | 7/2002 | Elzur .................. 709/224 |
| 6,427,171 B1 | 7/2002 | Craft et al. ........... 709/230 |
| 6,427,173 B1 | 7/2002 | Boucher et al. ....... 709/238 |
| 6,434,620 B1 | 8/2002 | Boucher et al. ....... 709/230 |
| 6,434,651 B1 | 8/2002 | Gentry, Jr. ........... 710/260 |
| 6,449,656 B1 | 9/2002 | Elzur et al. ........... 709/236 |
| 6,452,915 B1 | 9/2002 | Jorgensen |
| 6,453,360 B1 | 9/2002 | Muller et al. ......... 709/250 |
| 6,453,406 B1 | 9/2002 | Sarnikowski et al. |
| 6,470,415 B1 | 10/2002 | Starr et al. ........... 711/104 |
| 6,473,425 B1 | 10/2002 | Bellaton et al. ....... 370/392 |
| 6,480,489 B1 | 11/2002 | Muller et al. ......... 370/389 |
| 6,483,804 B1 | 11/2002 | Muller et al. |
| 6,487,202 B1 | 11/2002 | Klausmeier et al. .... 370/395 |
| 6,487,654 B2 | 11/2002 | Dowling .............. 712/244 |
| 6,490,631 B1 | 12/2002 | Teich et al. .......... 709/250 |
| 6,502,144 B1 | 12/2002 | Accarie ............... 710/8 |
| 6,523,119 B2 | 2/2003 | Pavlin et al. .......... 713/192 |
| 6,526,446 B1 | 2/2003 | Yang et al. |
| 6,542,504 B1 | 4/2003 | Mahler et al. |
| 6,570,884 B1 | 5/2003 | Connery et al. ....... 370/419 |
| 6,591,302 B2 | 7/2003 | Boucher et al. ....... 709/230 |
| 6,591,310 B1 | 7/2003 | Johnson .............. 710/3 |
| 6,594,261 B1 | 7/2003 | Boura et al. |
| 6,631,484 B1 | 10/2003 | Born |
| 6,648,611 B2 | 11/2003 | Morse et al. .......... 417/310 |
| 6,650,640 B1 | 11/2003 | Muller et al. ......... 370/392 |
| 6,657,757 B1 | 12/2003 | Chang et al. ......... 359/124 |
| 6,658,480 B2 | 12/2003 | Boucher et al. ....... 709/239 |
| 6,678,283 B1 | 1/2004 | Teplitsky ............ 370/463 |
| 6,681,364 B1 | 1/2004 | Calvignac et al. ..... 714/776 |
| 6,683,851 B1 | 1/2004 | Wilkie et al. |
| 6,687,758 B2 | 2/2004 | Craft et al. ........... 709/250 |
| 6,697,366 B1 | 2/2004 | Kim |
| 6,697,868 B2 | 2/2004 | Craft et al. ........... 709/230 |
| 6,751,665 B2 | 6/2004 | Philbrick et al. ....... 709/224 |
| 6,757,746 B2 | 6/2004 | Boucher et al. ....... 709/250 |
| 6,765,901 B1 | 7/2004 | Johnson et al. ....... 370/352 |
| 6,807,581 B1 | 10/2004 | Starr et al. ........... 709/250 |
| 6,842,896 B1 | 1/2005 | Redding et al. ....... 717/172 |
| 6,862,264 B1 | 3/2005 | Moura et al. |
| 6,912,522 B2 | 6/2005 | Edgar ................. 707/2 |
| 6,938,092 B2 | 8/2005 | Burns ................. 709/230 |
| 6,941,386 B2 | 9/2005 | Craft et al. ........... 709/250 |
| 6,965,941 B2 | 11/2005 | Boucher et al. ....... 709/230 |
| 6,976,148 B2 | 12/2005 | Arimilli et al. |
| 6,996,070 B2 | 2/2006 | Starr et al. ........... 370/252 |
| 7,016,361 B2 | 3/2006 | Swonk et al. |
| 7,042,898 B2 | 5/2006 | Blightman et al. ..... 370/463 |
| 7,047,320 B2 | 5/2006 | Arimilli et al. |
| 7,073,196 B1 | 7/2006 | Dowd et al. |
| 7,076,568 B2 | 7/2006 | Philbrick et al. ....... 709/250 |
| 7,089,326 B2 | 8/2006 | Boucher et al. ....... 709/242 |
| 7,093,099 B2 | 8/2006 | Bodas et al. .......... 711/206 |
| 7,124,205 B2 | 10/2006 | Craft et al. ........... 709/250 |
| 7,133,940 B2 | 11/2006 | Blightman et al. ..... 710/22 |
| 7,167,926 B1 | 1/2007 | Boucher et al. ....... 709/250 |
| 7,167,927 B2 | 1/2007 | Philbrick et al. ....... 709/250 |
| 7,174,393 B2 | 2/2007 | Boucher et al. ....... 709/250 |
| 7,181,531 B2 | 2/2007 | Pinkerton et al. |
| 7,185,266 B2 | 2/2007 | Blightman et al. ..... 714/776 |
| 7,187,679 B2 | 3/2007 | Dally et al. |
| 7,191,241 B2 | 3/2007 | Boucher et al. ....... 709/230 |
| 7,191,318 B2 | 3/2007 | Tripathy et al. ....... 712/225 |
| 7,237,036 B2 | 6/2007 | Boucher et al. ....... 709/245 |
| 7,254,696 B2 | 8/2007 | Mittal et al. .......... 712/210 |
| 7,260,518 B2 | 8/2007 | Kerr et al. |
| 7,283,522 B2 | 10/2007 | Siddabathuni |
| 7,284,070 B2 | 10/2007 | Boucher et al. ....... 709/250 |
| 7,287,092 B2 | 10/2007 | Sharp |
| 7,337,241 B2 | 2/2008 | Boucher et al. |
| 7,461,160 B2 | 12/2008 | Boucher et al. |
| 7,472,156 B2 | 12/2008 | Philbrick et al. |
| 7,496,689 B2 | 2/2009 | Sharp et al. |
| 7,502,869 B2 | 3/2009 | Boucher et al. |
| 7,512,144 B2 * | 3/2009 | Fan .................. H04L 69/16 370/419 |
| 7,519,699 B2 | 4/2009 | Jain et al. |
| 7,543,087 B2 | 6/2009 | Philbrick et al. |
| 7,584,260 B2 | 9/2009 | Craft et al. |
| 7,620,726 B2 | 11/2009 | Craft et al. |
| 7,627,001 B2 | 12/2009 | Craft et al. |
| 7,627,684 B2 | 12/2009 | Boucher et al. |
| 7,640,364 B2 | 12/2009 | Craft et al. |
| 7,664,868 B2 | 2/2010 | Boucher et al. |
| 7,664,883 B2 | 2/2010 | Craft et al. |
| 7,673,072 B2 | 3/2010 | Boucher et al. |
| 7,694,024 B2 | 4/2010 | Philbrick et al. |
| 7,738,500 B1 | 6/2010 | Jones et al. |
| 8,131,880 B2 * | 3/2012 | Boucher ............. H04L 12/5693 709/250 |
| 8,782,199 B2 * | 7/2014 | Boucher ............. H04L 29/06 709/223 |
| 2001/0004354 A1 | 6/2001 | Jolitz ................. 370/328 |
| 2001/0013059 A1 | 8/2001 | Dawson et al. ....... 709/217 |
| 2001/0014892 A1 | 8/2001 | Gaither et al. ........ 707/200 |
| 2001/0014954 A1 | 8/2001 | Purcell et al. ........ 714/4 |
| 2001/0025315 A1 | 9/2001 | Jolitz ................. 709/231 |
| 2001/0037406 A1 | 11/2001 | Philbrick et al. |
| 2001/0048681 A1 | 12/2001 | Bilic et al. ........... 370/389 |
| 2001/0053148 A1 | 12/2001 | Bilic et al. ........... 370/389 |
| 2002/0066011 A1 | 5/2002 | Vialen et al. ......... 714/758 |
| 2002/0073223 A1 | 6/2002 | Darnell et al. ........ 709/232 |
| 2002/0112175 A1 | 8/2002 | Makofka et al. ...... 713/200 |
| 2002/0156927 A1 | 10/2002 | Boucher et al. |
| 2003/0014544 A1 | 1/2003 | Pettey |
| 2003/0046330 A1 | 3/2003 | Hayes |
| 2003/0067903 A1 | 4/2003 | Jorgensen |
| 2003/0110344 A1 | 6/2003 | Szczepanek et al. .... 711/100 |
| 2003/0165160 A1 | 9/2003 | Minami et al. ....... 370/466 |
| 2003/0204631 A1 * | 10/2003 | Pinkerton ............ H04L 69/16 709/249 |
| 2004/0010712 A1 | 1/2004 | Hui et al. |
| 2004/0042458 A1 | 3/2004 | Elzu |
| 2004/0042464 A1 | 3/2004 | Elzur et al. |
| 2004/0049580 A1 | 3/2004 | Boyd et al. |
| 2004/0049601 A1 | 3/2004 | Boyd et al. |
| 2004/0054814 A1 | 3/2004 | McDaniel |
| 2004/0059926 A1 | 3/2004 | Angelo et al. ........ 713/168 |
| 2004/0088262 A1 | 5/2004 | Boucher et al. |
| 2004/0153578 A1 | 8/2004 | Elzur |
| 2004/0210795 A1 | 10/2004 | Anderson |
| 2004/0213290 A1 | 10/2004 | Johnson et al. ....... 370/469 |
| 2004/0246974 A1 | 12/2004 | Gyugyi et al. ........ 370/395.31 |
| 2004/0249957 A1 | 12/2004 | Ekis et al. |
| 2005/0060538 A1 | 3/2005 | Beverly |
| 2005/0144300 A1 | 6/2005 | Craft et al. |
| 2005/0166014 A1 * | 7/2005 | Kobayashi ........... G06F 3/0611 711/112 |
| 2006/0133386 A1 | 6/2006 | McCormack et al. |
| 2006/0248208 A1 | 11/2006 | Walbeck et al. |
| 2007/0083682 A1 | 4/2007 | Bartley et al. |
| 2007/0140240 A1 | 6/2007 | Dally et al. |
| 2008/0025210 A1 * | 1/2008 | Honary .............. H04L 47/10 370/229 |
| 2008/0037420 A1 * | 2/2008 | Tang ................. H04L 1/1607 370/229 |
| 2008/0043732 A1 | 2/2008 | Desai et al. |
| 2008/0170501 A1 | 7/2008 | Patel et al. |
| 2008/0209084 A1 | 8/2008 | Wang et al. |
| 2008/0240111 A1 | 10/2008 | Gadelrab |
| 2009/0063696 A1 | 3/2009 | Wang et al. |

FOREIGN PATENT DOCUMENTS

| | | |
|---|---|---|
| WO | WO 99/04343 | 1/1999 |
| WO | WO 99/65219 | 12/1999 |
| WO | WO 00/13091 | 3/2000 |
| WO | WO 01/04770 | 1/2001 |
| WO | WO 01/05107 | 1/2001 |
| WO | WO 01/05116 | 1/2001 |

(56) References Cited

FOREIGN PATENT DOCUMENTS

| WO | WO 01/05123 | 1/2001 |
|---|---|---|
| WO | WO 01/40960 | 6/2001 |
| WO | WO 01/59966 | 8/2001 |
| WO | WO 01/86430 | 11/2001 |
| WO | WO 2007-130476 | 11/2007 |

OTHER PUBLICATIONS

Zilog product Brief entitled "Z85C30 CMOS SCC Serial Communication Controller", Zilog Inc., 3 pages, 1997.
Internet pages of Xpoint Technologies, Inc. entitled "Smart LAN Work Requests", 5 pages, printed Dec. 19, 1997.
Internet pages entitled: Asante and 100BASE-T Fast Ethernet. 7 pages, printed May 27, 1997.
Internet pages entitled: A Guide to the Paragon XP/S-A7 Supercomputer at Indiana University. 13 pages, printed Dec. 21, 1998.
Richard Stevens, "TCP/IP Illustrated, vol. 1, The Protocols", pp. 325-326 (1994).
Internet pages entitled: Northridge/Southbridge vs. Intel Hub Architecture, 4 pages, printed Feb. 19, 2001.
Gigabit Ethernet Technical Brief, Achieving End-to-End Performance. Alteon Networks, Inc., First Edition, Sep. 1996, 15 pages.
Internet pages directed to Technical Brief on Alteon Ethernet Gigabit NIC technology, www.alteon.com, 14 pages, printed Mar. 15, 1997.
VIA Technologies, Inc. article entitled "VT8501 Apollo MVP4", pp. i-iv, 1-11, cover and copyright page, revision 1.3, Feb. 1, 2000.
iReady News Archives article entitled "iReady Rounding Out Management Team with Two Key Executives", http://www.ireadyco.com/archives/keyexec.html, 2 pages, printed Nov. 28, 1998.
"Toshiba Delivers First Chips to Make Consumer Devices Internet-Ready Based on iReady's Design," Press Release Oct. 1998, 3 pages, printed Nov. 28, 1998.
Internet pages from iReady Products, web sitehttp://www.ireadyco.com/products,html, 2 pages, downloaded Nov. 25, 1998.
iReady News Archives, Toshiba, iReady shipping Internet chip, 1 page, printed Nov. 25, 1998.
Interprophet article entitled "Technology", http://www.interprophet.com/technology.html, 17 pages, printed Mar. 1, 2000.
iReady article entitled "About Us Introduction", Internet pages fromhttp://www.iReadyco.com/about.html, 3 pages, printed Nov. 25, 1998.
iReady News Archive article entitled "Revolutionary Approach to Consumer Electronics Internet Connectivity Funded", San Jose, CA, Nov. 20, 1997. 2 pages, printed Nov. 2, 1998.
iReady News Archive article entitled "Seiko Instruments Inc. (SII) Introduces World'S First Internet-Ready Intelligent LCD Modules Based on iReady Technology," Santa Clara, CA and Chiba, Japan, Oct. 26, 1998. 2 pages, printed Nov. 2, 1998.
NEWSwatch article entitled "iReady internet Tuner to Web Enable Devices", Tuesday, Nov. 5, 1996, printed Nov. 2, 1998, 2 pages.
EETimes article entitled "Tuner for Toshiba, Toshiba Taps iReady for Internet Tuner", by David Lammers, 2 pages, printed Nov. 2, 1998.
"Comparison of Novell Netware and TCP/IP Protocol Architectures", by J.S. Carbone, 19 pages, printed Apr. 10, 1998.
Adaptec article entitled "AEA-7110C-a DuraSAN product", 11 pages, printed Oct. 1, 2001.
iSCSI HBA article entitled "iSCSI and 2Gigabit fibre Channel Host Bus Adapters from Emulex, QLogic, Adaptec, JNI", 8 pages, printed Oct. 1, 2001.
iSCSI HBA article entitled "FCE-3210/6410 32 and 64-bit PCI-to-Fibre Channel HBA", 6 pages, printed Oct. 1, 2001.
ISCSI.com article entitled "iSCSI Storage", 2 pages, printed Oct. 1, 2001.
"Two-Way TCP Traffic Over Rate Controlled Channels: Effects and Analysis", by Kalampoukas et al., IEEE Transactions on Networking, vol. 6, No. 6, Dec. 1998, 17 pages.

IReady News article entitled "Toshiba Delivers First Chips to Make Consumer Devices Internet-Ready Based on iReady Design", Santa Clara, CA, and Tokyo, Japan, Oct. 14, 1998, printed Nov. 2, 1998, 3 pages.
Internet pages of InterProphet entitled "Frequently Asked Questions", by Lynne Jolitz, printed Jun. 14, 1999, 4 pages.
Adaptec Press Release article entitled "Adaptec Announces EtherStorage Technology", 2 pages, May 4, 2000, printed Jun. 14, 2000.
Adaptec article entitled "EtherStorage Frequently Asked Questions", 5 pages, printed Jul. 19, 2000.
Adaptec article entitled "EtherStorage White Paper", 7 pages, printed Jul. 19, 2000.
CIBC World Markets article entitled "Computers; Storage", by J. Berlino et al., 9 pages, dated Aug. 7, 2000.
Merrill Lynch article entitled "Storage Futures", by S. Milunovich, 22 pages, dated May 10, 2000.
CBS Market Watch article entitled "Montreal Start-Up Battles Data Storage Botttleneck", by S. Taylor, dated Mar. 5, 2000, 2 pages, printed Mar. 7, 2000.
Internet-draft article entitled "SCSI/TCP (SCSI over TCP)", by J. Satran et al., 38 pages, dated Feb. 2000, printed May 19, 2000.
Internet pages entitled Technical White Paper-Xpoint's Disk to LAN Acceleration Solution for Windows NT Server, printed Jun. 5, 1997, 15 pages.
Jato Technologies article entitled Network Accelerator Chip Architecture, twelve-slide presentation, printed Aug. 19, 1998, 13 pages.
EETimes article entitled Enterprise System Uses Flexible Spec, dated Aug. 10, 1998, printed Nov. 25, 1998, 3 pages.
Internet pages entitled "Smart Ethernet Network Interface Cards", which Berend Ozceri is developing, printed Nov. 25, 1998, 2 pages.
Internet pages of Xaqti corporation entitled "GigaPower Protocol Processor Product Review," printed Nov. 25, 1999, 4 pages.
U.S. Appl. No. 60/283,896, Titled: CRC Calculations for Out of Order PUDs, filed Apr. 12, 2003, Inventor: Amit Oren, Assignee: Siliquent Technologies Ltd.
Internet pages entitled "DART: Fast Application Level Networking via Data-Copy Avoidance," by Robert J. Walsh, printed Jun 3, 1999, 25 pages.
Andrew S. Tanenbaum, Computer Networks, Third Edition, 1996, ISBN 0-13-349945-6.
Internet RFC/STD/FYI/BCP Archives article with heading "RFC2140" entitled "TCP Control Block Interdependence", web address http://www.faqs.org/rfcs/rfc2140.html, 9 pages, printed Sep. 20, 2002.
WindRiver article entitled "Tornado: For Intelligent Network Acceleration", copyright Wind River Systems, 2001, 2 pages.
WindRiver White Paper entitled "Complete TCP/IP Offload for High-Speed Ethernet Networks", Copyright Wind River Systems, 2002, 7 pages.
Intel article entitled "Solving Server Bottlenecks with Intel Server Adapters", Copyright Intel Corporation, 1999, 8 pages.
Schwaderer et al., IEEE Computer Society Press publication entitled, "XTP in VLSI Protocol Decomposition for ASIC Implementation", from 15th Conference on Local Computer Networks, 5 pages, Sep. 30-Oct. 3, 1990.
Beach, Bob, IEEE Computer Society Press publication entitled, "UltraNet: An Architecture for Gigabit Networking", from 15th Conference on Local Computer Networks, 18 pages, Sep. 30-Oct. 3, 1990.
Chesson et al., IEEE Syposium Record entitled, "The Protocol Engine Chipset", from Hot Chips III, 16 pages, Aug. 26-27, 1991.
Maclean et al., IEEE Global Telecommunications Conference, Globecom '91, presentation entitled, "An Outboard Processor for High Performance Implementation of Transport Layer Protocols", 7 pages, Dec. 2-5, 1991.
Ross et al., IEEE article entitled "FX1000: A high performance single chip Gigabit Ethernet NIC", from Compcon '97 Proceedings, 7 pages, Feb. 23-26, 1997.
Strayer et al., "Ch. 9: The Protocol Engine" from XTP: The Transfer Protocol, 12 pages, Jul. 1992.
Publication entitled "Protocol Engine Handbook", 44 pages, Oct. 1990.

(56) References Cited

OTHER PUBLICATIONS

Koufopavlou et al., IEEE Global Telecommunications Conference, Globecom '92, presentation entitled, "Parallel TCP for High Performance Communication Subsystems", 7 pages, Dec. 6-9, 1992.

Lilienkamp et al., Publication entitled "Proposed Host-Front End Protocol", 56 pages, Dec. 1984.

Thia et al. Publication entitled "High-Speed OSI Protocol Bypass Algorithm with Window Flow Control," Protocols for High Speed Networks, pp. 53-68, 1993.

U.S. Appl. No. 60/053,240, Titled: TCP/IP Network Accelerator and Method of Use, filed Jul. 17, 1997, Inventor: William Jolizt et al.

Thia et al. Publication entitled "A Reduced Operational Protocol Engine (ROPE) for a multiple-layer bypass architecture," Protocols for High Speed Networks, pp. 224-239, 1995.

Form 10-K for Exelan, Inc., for the fiscal year ending Dec. 31, 1987 (10 pages).

Form 10-K for Exelan, Inc., for the fiscal year ending Dec. 31, 1988 (10 pages).

Merritt, Rick. "Ethernet Interconnect Infiniband at Intel." EE Times article. Sep. 12, 2003. 3 pages.

Craft, Peter K. et al. "TCP Offload Device that Batches Session Layer Headers to Reduce Interrupts as Well as CPU Copies." U.S. Appl. No. 12/581,342. Confirmation No. 2393; filed Oct. 19, 2009.

Craft, Peter K. et al. "TCP Offload Send Optimization." U.S. Appl. No. 12/504,021. Confirmation No. 9303; filed Jul. 16, 2009.

Philbrick, Clive M. et al. "Freeing Transmit Memory on a Network Interface Device Prior to Receiving an Acknowledgment That Transmit Data Has Been Received by a Remote Device." U.S. Appl. No. 12/470,980. Confirmation No. 4934; filed May 22, 2009.

Starr, Daryl D. et al. "Accelerating Data Transfer in a Virtual Computer System with Tightly Coupled TCP Connections." U.S. Appl. No. 12/410,366. Confirmation No. 3065; filed Mar. 24, 2009.

Boucher, Laurence B. et al. "Obtaining a Destination Address So That a Network Interface Device Can Write Network Data Without Headers Directly Into Host Memory." U.S. Appl. No. 12/235,941. Confirmation No. 2493; filed Dec. 1, 2008.

Boucher, Laurence B. et al. "Enabling An Enhanced Function Of An Electronic Device." U.S. Appl. No. 11/985,948. Confirmation No. 9878; filed Nov. 19, 2007.

Starr, Daryl D. et al. "Network Interface Device With 10 Gb/s Full-Duplex Transfer Rate." U.S. Appl. No. 11/799,720. Confirmation No. 6200; filed May 1, 2007.

Craft, Peter K. et al. "Peripheral Device That DMAS The Same Data To Different Locations In A Computer." U.S. Appl. No. 11/788,719. Confirmation No. 5750; filed Apr. 19, 2007.

Boucher, Laurence B. et al. "TCP/IP Offload Network Interface Device." U.S. Appl. No. 11/701,705. Confirmation No. 7450; filed Feb. 2, 2007.

Starr, Daryl D. et al. "TCP/IP Offload Device With Reduced Sequential Processing." U.S. Appl. No. 11/348,810. Confirmation No. 8739; filed Feb. 6, 2006.

Craft, Peter K. et al. "Transferring Control of TCP Connections Between Hierarchy of Processing Mechanisms." U.S. Appl. No. 11/249,006. Confirmation No. 3046; filed Oct. 11, 2005.

Boucher, Laurence B. et al. "Network Interface Device That Can Transfer control of a TCP Connection to a Host CPU." U.S. Appl. No. 11/029,863. Confirmation No. 6345; filed Jan. 4, 2005.

Craft, Peter K. et al. "Protocol Stack That Offloads a TCP Connection From a Host Computer to a Network Interface Device." U.S. Appl. No. 11/027,842. Confirmation No. 6231; filed Dec. 30, 2004.

Craft, Peter K. et al. "Protocol Stack That Offloads A TCP Connection From A Host Computer To A Network Interface Device." U.S. Appl. No. 11/016,642. Confirmation No. 2157; filed Dec. 16, 2004.

Boucher, Laurence B. et al. "Method and Apparatus for Dynamic Packet Batching With a High Performance Network Interface." U.S. Appl. No. 10/678,336. Confirmation No. 9798; filed Oct. 3, 2003.

Philbrick Clive M. et al. "Method and Apparatus for Data Re-Assembly With A High Performance Network Interface." U.S. Appl. No. 10/634,062. Confirmation No. 5537; filed Aug. 4, 2003.

Boucher, Laurence B. et al. "High Network Interface Device And System For Accelerated Communication." U.S. Appl. No. 10/601,237. Confirmation No. 9286; filed Jun. 19, 2003.

Boucher, Laurence B. et al. "Method and Apparatus For Distributing Network Traffic Processing On A Multiprocessor Computer." U.S. Appl. No. 10/438,719. Confirmation No. 7151; filed May 14, 2003.

Boucher, Laurence B. et al. "Parsing A Packet Header." U.S. Appl. No. 10/277,604. Confirmation No. 7644; filed Oct. 18, 2002.

Starr, Daryl D.. et al. "Intelligient Network Storage Interface System." U.S. Appl. No. 10/261,051. Confirmation No. 6753; filed Sep. 30, 2002.

Boucher, Laurence B. et al. "Intelligent Network Interface System and Method for Accelerated Protocol Processing." U.S. Appl. No. 09/692,561. Confirmation No. 5890; filed Oct. 18, 2000.

Starr, David D. et al. "Intelligent Network Storage Interface Device." U.S. Appl. No. 09/675,700. Confirmation No. 9585; filed Sep. 29, 2000.

Merritt, Rick. "Ethernet Interconnect Outpacing Infiniband at Intel." EE Times article. Sep. 11, 2002. 9 pages.

Chandranmenon, Girish P. et al. "Trading Packet Headers for Packet Processing." IEEE/ACM Transactions on Networking. vol. 4, No. 2. Apr. 1996. pp. 141-152.

* cited by examiner

TCP OFFLOAD SEND OPTIMIZATION

CROSS-REFERENCE TO RELATED APPLICATIONS

This application claims the benefit under 35 U.S.C. 120 of (is a divisional of) application Ser. No. 12/504,021, filed Jul. 16, 2009, which in turn claims the benefit under 35 U.S.C. 119 of Provisional Patent Application Ser. No. 61/085,352, filed Jul. 31, 2008. Both of those applications have the same title and inventors as the present application, and both of those applications are incorporated by reference herein.

BACKGROUND

This invention relates to network communication, for example serial communication between devices using a protocol such as Transmission Control Protocol (TCP).

TCP has been employed for decades and has increased in popularity, or at least in usage, over the years. An advantage of TCP is its guaranteed delivery of error free data. Unfortunately, this guarantee comes with a price of greater complexity relative to some other network protocols. Such complexity can slow TCP communication, or at least make it difficult for TCP to be used as network data rates increase, for example from 100 MB/s ten years ago to 10 GB/s currently. Moreover, even for a 100 MB/s transmission line rate that was conventional ten years ago, TCP processing at the endpoints of the network proved a bottleneck that slowed network communication, as well as consumed inordinate CPU cycles.

A solution to the TCP bottleneck was provided by Alacritech, Inc., which offloaded established TCP connections from the host CPU to hardware that could process data transfer much more rapidly, significantly increasing TCP data transfer rates while reducing CPU utilization. Descriptions and claims to such a solution can be found in multiple patents, including U.S. Pat. Nos. 7,337,241; 7,284,070; 7,254,696; 7,237,036; 7,191,318; 7,191,241; 7,185,266; 7,174,393; 7,167,927; 7,167,926; 7,133,940; 7,124,205; 7,093,099; 7,089,326; 7,076,568; 7,042,898; 6,996,070; 6,965,941; 6,941,386; 6,938,092; 6,807,581; 6,757,746; 6,751,665; 6,697,868; 6,687,758; 6,658,480; 6,591,302; 6,470,415; 6,434,620; 6,427,173; 6,427,171; 6,393,487; 6,389,479; 6,334,153; 6,247,060; and 6,226,680, which are incorporated by reference herein. Also incorporated by reference is U.S. patent application Ser. No. 11/799,720, filed May 1, 2007.

For a situation in which an application is running on a host CPU while a TCP connection for that application is handled by a network interface card, however, certain communications between the host and the device could hamper performance. For example, some previous Alacritech host interface designs employed a command-response interface for sending data. That is, if an application performed a send, the host would encapsulate that send in a command. The address of that command was then written to the card, which would read out the command contents and send the data specified. When that data was fully acknowledged by the peer (the other side of the TCP connection), the card would notify the driver of the command completion by filling in a response buffer.

This interface worked well when performing large data transfers. For instance, if the application sent 64 KB of data, the driver would encapsulate it into a single command and hand it to the card. After all 64 KB of data was sent and acknowledged, the card would send a response to the host. As a result, 64 KB of data required only two interactions with the card—a dramatic reduction compared to traditional networking, which would have required sending 44 segments and processing ~22 ACKs (assuming the default ACK-every-other-segment behavior of Windows®).

That command/response interface did not perform nearly so well, however, with small data transfers. For example, consider an application that is instead sending 64-byte sends asynchronously (meaning it doesn't wait for a previous send to complete before starting on the next one). In the previous model, the host would have constructed a command for each send, and received a response every time a send was acknowledged—a particularly high overhead for such a small amount of data. Although there were times when multiple sends could be coalesced into a single command, the inherent problem of relatively high overhead for small packet sends has remained.

SUMMARY

The problem has been solved, in one exemplary embodiment, by batching the notification that relatively small data transmit commands have completed whereas the notification that relatively large data transmit commands have completed are not batched. In one exemplary embodiment, the notification that data transmit commands have completed may be intrinsically modulated by the size and frequency of the commands and the processing of the data transfer by the TCP connection.

In one exemplary embodiment, a method is disclosed comprising: running, on a network interface for a computer, a TCP connection for an application, including maintaining a SndUna value for the TCP connection; setting a SndUna threshold at the network interface; and providing the SndUna value to the computer when the SndUna value is greater than or equal to the SndUna threshold.

In one exemplary embodiment, a method is disclosed comprising: running an application on a computer having a network interface; running, on the network interface, a transmission control protocol (TCP) connection for the application; providing, by the computer to the network interface, a command to send data from the application; updating, by the network interface, a SndUna value for the TCP connection; and providing, by the network interface to the computer, the SndUna value, thereby indicating to the computer that the command has been completed.

DETAILED DESCRIPTION OF THE PREFERRED EMBODIMENTS

Figure 1:
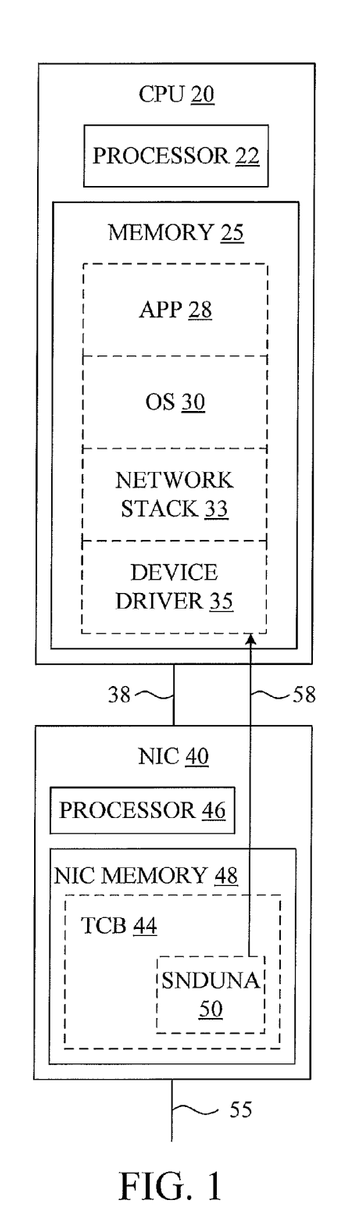
FIG. 1 is a schematic block diagram of a computer and network interface card (NIC) that transfers a SndUna value to the computer.
Figure 2:
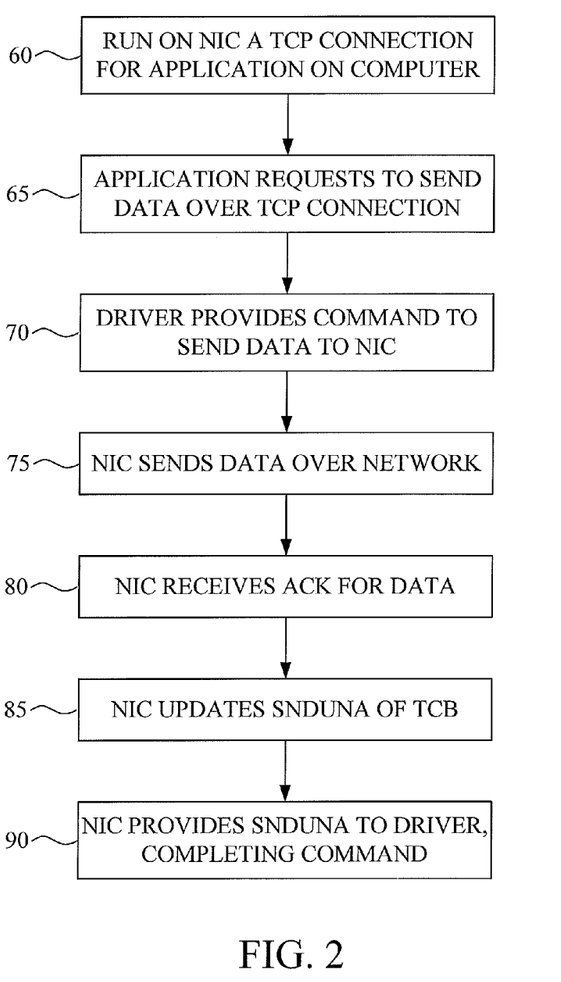
FIG. 2 is a flow chart of a process for sending data by the computer and NIC of FIG. 1 in which the NIC notifies the computer that a send command has completed by transferring a SndUna value to the computer.

FIG. 1 shows a computer 20 having a central processing unit (CPU) 22 and a memory 24. Although a single processor and memory are shown to facilitate understanding by showing the minimal elements of a computer, plural processors and/or plural memories may be employed in place of those individual elements, in this embodiment as well as in subsequent embodiments. The computer 20 is connected to a network interface such as a NIC 40 by an I/O channel 38 such as a PCI bus, and the NIC 40 is connected to a network 55.

The computer 20 is running an operating system (OS) 30, with an application 28 running above the OS 30. The operating system 30 has a network stack 33 that includes conventional components such as a TCP layer and an Internet Protocol (IP) layer, and may include instructions regarding offloading and uploading TCP connections to and from NIC 40. A device driver 35 allows the OS 30 to interact with the NIC 40.

The NIC 40 includes a processor 46 and memory 48, and may also include other communications processing hardware and instructions for handling a TCP connection, including maintaining the connection as a TCP control block (TCB) 44 in NIC memory 48. A TCB is a large block of information, occupying well over 100 bytes and 100 fields, which stores the status of TCP communication for a particular connection. Many of the TCB fields are interrelated and many of the TCB fields change rapidly for an active connection. One of the many variables maintained in TCB 44 is a SndUna value 50, which indicates the data for that TCB that has been transmitted by NIC 40 and acknowledged (ACKed) by a receiving node. According to the TCP protocol, every byte transferred over a TCP connection is given a sequence number, which is used in part to track whether data has been successfully transferred. The SndUna value, like the ACK from which it is derived, indicates the contiguous data that has been successfully transferred, by indicating the next expected sequence number (i.e., the sequence number immediately following the largest sequence number of the contiguous data that has been successfully transferred).

The NIC 40 may include instructions regarding offloading and uploading TCP connections from and to computer 20, which is sometimes referred to as "partial offload" or "dynamic offload," or the NIC may establish, maintain and close TCP connections without transfer to or from the computer, which is sometimes referred to as "full offload." In either of these cases, the NIC 40 may sometimes be referred to as a "TCP offload engine" or "TOE." Similarly, although the NIC 40 is shown as a separate entity in FIG. 1 to facilitate illustration, a network interface may be connected to processor 22 and memory 24 by an internal computer bus rather than an I/O channel. In the example shown in FIG. 1, TCB 44 is employed to communicate over network 55 between application 28 and a peer application on a remote node.

As noted above, some prior art TOEs communicated to their computers the successful transmission of data for a TCP connection by posting a "response buffer" to a "command" to send the data. In one embodiment, instead of posting a "response buffer", the mechanism by which these sends are completed is the current SndUna value 50, which is set based on acknowledgments received from the peer. As represented by arrow 58, the SndUna value 50 is sent from NIC 40 to device driver 35 to indicate that the transmission of certain application 28 data to the peer has been successfully completed by NIC 40.

In this embodiment, while the SndUna value 50 contained within the TCB 44 is owned and adjusted by the NIC 40, the computer 20 can very easily keep an association between pending sends and their starting and ending sequence numbers. This is due to the fact that each byte sent corresponds to a single sequence number. For example, say the starting sequence number at the time a connection is offloaded to the NIC 40 is 10000. Also assume that the driver 35 is given a series of 64-byte sends which it provides to the NIC 40. The computer 20 can easily keep track of the starting and ending sequence numbers of each send (send #1 starts with 10000, send #2 starts with 10064, and so on).

The NIC 40 can then complete one or more sends by simply providing the computer 20 with the current SndUna value 50. Using the above example, a SndUna value 50 of 10100 would complete the first send, but not the second, since the second send starts with 10064, but ends with 10127.

This offers a convenient way to notify the computer 20 of the completion of a batch of sends by the NIC 40. A SndUna value of 12960 in the above example would complete 46 64-byte sends at once back to the device driver 35. In turn, the driver 35 can complete this entire batch of sends back to the network stack 33 above it, and subsequently to the application 28. The savings of this embodiment are tremendous when contrasted against the response-per-send model of the prior art.

One challenge, which has been solved as explained below, is determining when the NIC 40 should send these SndUna values 50 (also known as "SndUna updates" or "SndUna events") to the host computer 20. If one considers the 64-byte send example, the temptation would be to have the NIC 40 issue a SndUna event every time it receives an ACK from the peer. It should be noted that TCP implementations typically only send acknowledgments after they've received a minimum amount of data (or a delayed ACK timer expires). A typical minimum value is two full segments—2960 bytes in the case of IPv4 with no TCP options and standard Ethernet Maximum Transmission Unit (MTU).

But a SndUna event per ACK would be inefficient if applied to 64 KB sends in comparison with the previous Alacritech command-response mechanism. As noted above, that previous host interface resulted in a single response buffer per 64 KB send. If instead a SndUna event is provided to the host per ACK, and the peer were to ACK every other segment, the driver would have to process 22 SndUna events (44 send segments per 64 KB assuming standard MTU) before the 64 KB send was completely acknowledged, which requires far greater overhead than the previous Alacritech command-response mechanism.

To overcome this problem, in one embodiment a mechanism is utilized that ensures that a SndUna event from the NIC 40 completes, at a minimum, one outstanding send operation. In one embodiment, the NIC 40 keeps track of the ending sequence number of the data denoted by any send commands that it has received from the driver 35, to forward a SndUna value or related number to the driver indicating that at least one of the commands has been completed. This minimum value for forwarding a SndUna event may be termed a SndUna threshold.

Figure 3:
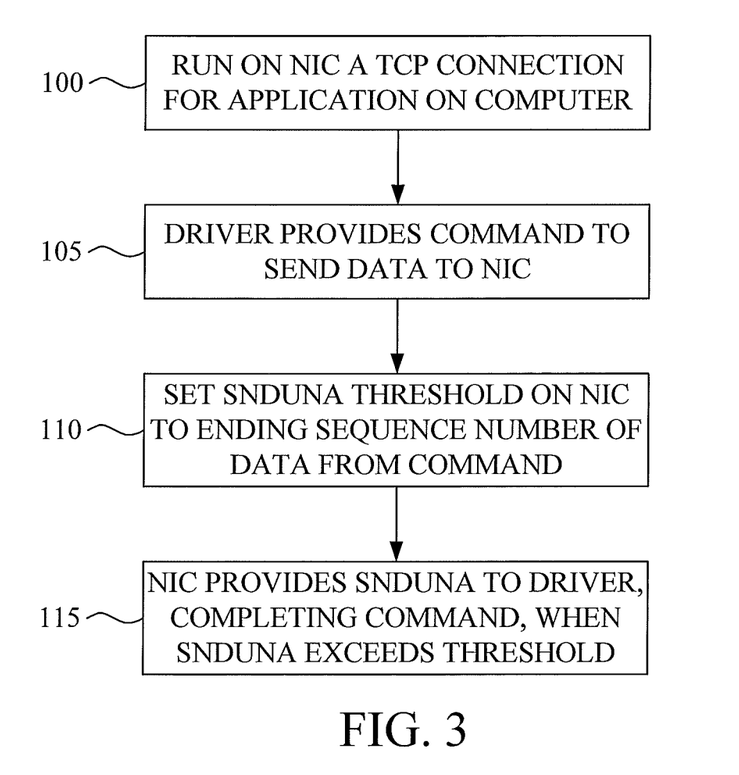
FIG. 3 is a flow chart of a process for sending data by the computer and NIC of FIG. 1 in which the NIC notifies the computer that a send command has completed by transferring a SndUna value to the computer when the SndUna value equals or exceeds a SndUna threshold.

As shown FIG. 3, a method according to this embodiment can include running 100 on a network interface a TCP connection for an application running on a computer; providing 105 by the computer to the network interface a command to send data for the application; setting 110 a SndUna threshold on the network interface based upon the ending sequence number of the data; and providing 115 by the NIC to the computer an indication that the command has completed, when the SndUna value exceeds the threshold.

Another problem that has been discovered, however, is that it is more difficult than it might first appear for a program running on the NIC processor 40 to keep track of the ending sequence number of each send command that is outstanding on the NIC 40. Note that the processor 46 cannot simply keep track of the ending sequence number of the first outstanding send, because once that is completed, it then needs to know the sequence number of the next outstanding send. Although possible, this can require a costly amount of highly accessible storage such as SRAM.

In one embodiment, the task of tracking the ending sequence number of the send commands outstanding on the NIC 40 is instead handled by the device driver 35. When multiple sends are outstanding, the driver 35 in this embodiment is responsible for providing the NIC 40 with a SndUna threshold value that indicates the completion the first outstanding send. Returning to the previous example in which multiple 64-byte sends were outstanding and the starting sequence number was 10000, the driver 35 would in this case provide the NIC 40 with a SndUna threshold of 10064, so that the NIC would provide to the driver the current SndUna value when it equaled or exceeded 10064. If the NIC 40 were to receive an ACK for 10030, it would update its TCB 44 accordingly, but not issue a SndUna event. If it were to receive an ACK for 10100, however, it would also issue a SndUna event. Upon receiving this event, the driver 35 would complete the first outstanding send to the network stack 33 and application 28 above it, and issue a new SndUna threshold of 10128 (the sequence number which completes the next outstanding send) to the NIC 40.

As noted above, it is unlikely that the NIC 40 would receive an ACK for 10100. A more likely value would be the 2-full-segment value of 12960, which would complete 46 sends. That ACK, being larger than the current SndUna threshold of 10064, would result in a SndUna event which specified a current value of 12960. That would in turn cause the driver 35 to complete 46 of the outstanding sends. After doing so, the driver 35 would provide a new SndUna threshold of 13008, which is the sequence number of the 47th 64-byte send.

Note that this embodiment avoids paying a penalty with large sends in comparison with the prior art command-response mechanism. When multiple 64 KB sends are outstanding, the SndUna threshold is set to the end of the first send, so like the prior art host interface, in this embodiment the host will receive a single SndUna event, like the single response buffer of the prior art, per send. In other words, this embodiment can batch the notification that relatively small data transmit commands have completed whereas the notification that relatively large data transmit commands have completed are not batched.

Figure 4:
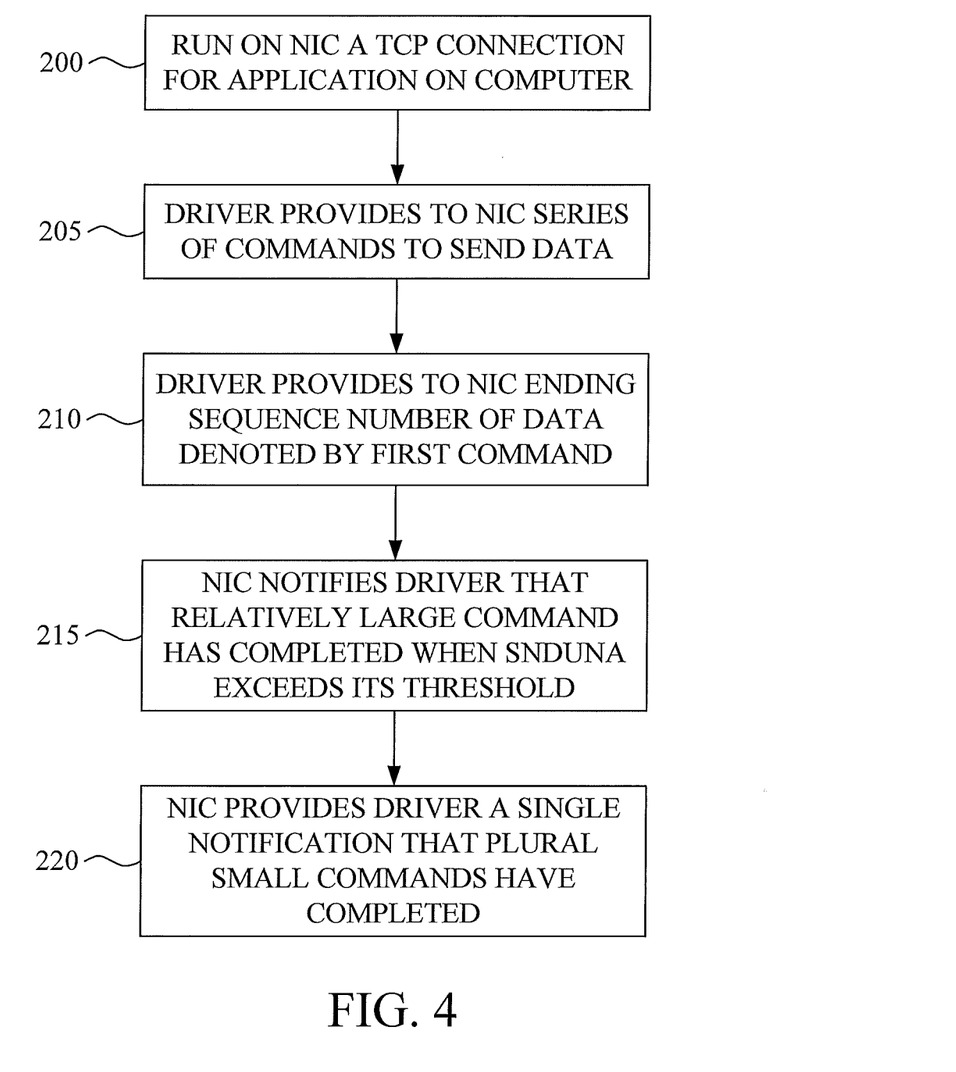
FIG. 4 is a flow chart of a process for sending data by the computer and NIC of FIG. 1 in which the NIC notifies the computer that a single large send command has completed and separately provides a single notification that several small send commands have completed.

As shown in FIG. 4, one embodiment includes running 200 on the NIC 40 a TCP connection for corresponding applications on the computer 20, and providing 205 by the computer to the network interface a series of commands to transmit data from the application by the network interface. The commands may vary in the size of the data that they denote, so that a plurality of the commands together denote an amount of data that is less than the amount denoted by one of the commands. The driver 35 in this embodiment provides to the NIC 40 an ending sequence number of a first of the commands, which is stored as a SndUna threshold by the NIC 40. This first command may be for the one relatively large command, and may be completed when the SndUna value for the connection equals or exceeds the SndUna threshold that has been provided to NIC 40, which may be set to equal the ending sequence number of the data denoted by that command. The NIC 40 then provides 215 to the driver 35 a notification that the one relatively large command has been completed, for example by providing the SndUna value to the driver. A SndUna threshold may then be set to an ending sequence number of the first of the relatively small commands. The data denoted by all the relatively small commands may be acknowledged in an ACK having a sequence number exceeding the SndUna threshold, causing the NIC 40 to provide 220 to the driver 35 a single notification that the plurality of relatively small commands have been completed, for example by providing the SndUna value to the driver.

A surprising advantage of making the driver 35 responsible for setting the SndUna threshold on the NIC 40 is that the completion notification mechanism in this embodiment has some self-tuning attributes. Consider, for example, a series of 2920-byte sends from the host computer 20, starting with relative sequence number 0. In a typical environment, each of these sends (being 2 full segments) would result in an ACK from the peer. If the NIC 40 were to implement an embodiment in which the SndUna value 50 is provided to the driver 35 whenever an ACK completes a send command, then it would result in a SndUna event per send. This may be optimal if the host could keep up, but imagine that the host CPU 20 is having trouble keeping up with this amount of traffic. In that case what is likely to happen in one exemplary embodiment in which the driver 35 is responsible for setting the SndUna threshold on the NIC 40 is the following:

1. Multiple 2920-byte sends are provided to the NIC 40;
2. The driver 35 provides a SndUna threshold of 2920 (the acknowledgment that completes the first outstanding send) to the NIC 40;
3. On the arrival of the first ACK, a SndUna event with a value of 2920 is generated (the SndUna value 50 of 2920 is provided to the driver 35);
4. At this point the host 20 is delayed in processing the SndUna event due to the fact that it is CPU-bound;
5. Additional acknowledgements arrive on the NIC 40, but since there is no outstanding SndUna threshold they do not result in SndUna events to the host;
6. Ultimately the driver processes the SndUna event, completes the first send, and issues a SndUna threshold of 5840—the acknowledgment that completes the next outstanding send;
7. Upon receiving a SndUna threshold of 5840, the NIC 40, having received several acknowledgments greater than 5840 (step 5), issues a SndUna event with the current SndUna value. This event results in the completion of several outstanding events.

In other words, the delay in step 4 actually facilitates additional batching and "self-tunes" based on CPU load. Stated differently, the notification that data transmit commands have completed may be intrinsically modulated by the size and frequency of the commands and the processing of the data transfer by the TCP connection.

In one embodiment, assurance is provided that the SndUna threshold mechanism does not result in undesired latency. Consider, for instance, a situation in which the application 28 has sent a series of sends and is then waiting for the last of the sends to be completed. Undesirable delay could be caused by the NIC 40 waiting for a SndUna threshold to be provided to the NIC before completing the last outstanding send. For this reason, when the NIC 40 receives an acknowledgment that completes all of its outstanding data (SndUna=SndNxt), it automatically issues a SndUna event to the driver 35.

On the other hand, when the host computer 20 has a single send command outstanding, it doesn't bother setting the SndUna threshold in one embodiment. This is because the processor 46 microcode is written to complete the single command when all outstanding send data is ACKed. When the host has two or more outstanding send commands, the host sets the SndUna threshold to the ending sequence of the first outstanding command. As SndUna events are received from the NIC 40, associated commands are completed back to the OS 30. Then, if there are still multiple commands outstanding, a new SndUna threshold is given to the processor 46 running the microcode, again set to the ending sequence number of the first outstanding send command.

Careful consideration of a variety of such scenarios has led to the development, in one embodiment, of the following set of rules:

A) Driver 35 Response to a New Host Computer 20 TCP Send Request:
  If no other send requests outstanding, don't set SndUna threshold;
  Else, if SndUna threshold already set, don't set SndUna threshold;
  Else, set SndUna threshold to ending sequence number of first outstanding send request.

B) Driver 35 Response to a SndUna Event from Network Interface 40:
  ASSERT SndUna event>=outstanding SndUna threshold;
  ASSERT new SndUna value completes at least one command;
  Mark SndUna threshold as not set.
  Complete command(s):
  If multiple commands outstanding set new SndUna threshold to the ending sequence number of the next outstanding send command.

C) Network Interface 40 Operation for ACK Processing:
  If all outstanding data is ACKed (SndUna=SndNxt), then issue a SndUna event to the host and clear SndUna threshold;
  Else, if ACK exceeds SndUna threshold, issue a SndUna event and clear SndUna threshold;
  Else, don't issue SndUna event.

D) Network Interface 40 Operation for New SndUna Threshold Value:
  If SndUna threshold value is less than previous SndUna event, ignore SndUna threshold value;
  Else if SndUna threshold is already set, panic;
  Else if current SndUna exceeds new SndUna threshold value, issue a SndUna event and clear SndUna threshold;
  Else, store SndUna threshold and wait for ACK.

Some or all of these rules may be used in a particular embodiment. Moreover, while the embodiments above have typically involved providing a SndUna value from the NIC 40 to the driver 35, in other embodiments other numbers could instead be used, provided that the driver 35 or another entity on a host such as computer 20 keeps track of certain byte sequence numbers for connections that are owned by a network interface such as NIC 40. For example, one embodiment can include providing, for an offloaded connection, a command to send data while maintaining, by the computer, an ending sequence number for the data corresponding to the command; and notifying the computer, by the network interface, that the command has been completed by providing to the computer a sequence number from which the ending sequence number can be determined. Thus, even if a computer does not know the sequence numbers used by a network interface for an offloaded TCP connection, once an ending sequence number is known to complete a particular command, relative sequence numbers can be established between the computer and the network interface that allows the computer to determine whether a another command has been completed.

Evidence that a system employs the present invention can take many forms. In one example, for a situation in which a binary device driver and interface device are available but source code is not, it may be possible to reverse engineer the communication between the driver and the interface device using a logic analyzer. This process may be enhanced with the use of a NDIS filter driver in Windows®. An NDIS filter driver could be implemented to monitor interactions between a NDIS device driver and the TCP stack above it. For instance, a filter driver could be written to "catch" chimney send completions that are performed by the underlying driver. For example, the filter driver could be written to trigger a logic analyzer (by writing to a specified PCI address for instance), as well as stop the system (via an assert or panic of some kind).

Having done this, one can correlate several pieces of information. From the filter driver one can extract the contents of the send completion to determine which send is being completed. One can also locate the corresponding data and associated acknowledgements on a sniffer attached to the network. One can analyze the interaction between the interface device and the driver that occurred immediately before the send completion. Using this information one may determine the process by which the interface device completes send commands to the driver.

It may be possible then to further analyze the relationship between send commands, acknowledgments on the wire, and send completions from the card to the host. For instance, if acknowledgments arrive which acknowledge all data for a given outstanding send command, and those acknowledgments do not result in a send completion from the card, then one can surmise that the interface device is batching multiple send completions together. Further analysis of the data being passed between the driver and the interface device (using the PCI analyzer) may be used to identify SndUna values. Since SndUna values are comprised of a 4-byte sequence number, they are pretty reliably identifiable—a coincidental match has a probability of one in four billion.

If one sees an acknowledgment value specified by the host to the interface device (contained in data written to the interface device, or read out of host memory by the interface device) and then a subsequent send completion that is triggered by the receipt of an ACK (packet) equal to or greater than this value, then one can be reasonably certain that the system is using the innovations disclosed herein.

Although we have focused on detailed descriptions of particular embodiments, other embodiments and modifications are within the spirit of this invention as defined by the appended claims. For example, although TCP is discussed as an exemplary transport level protocol, other protocols that define logical connections using streams of bytes may instead be employed. As another example, although particular numbers are discussed, such as setting a SndUna threshold to be equal to an ending sequence number of data denoted by a command, varying either or both sequence numbers slightly could still perform the same function in the same way with the same result, and is therefore intended to be covered.

The invention claimed is:

1. A method comprising:
  running an application on a computer having a network interface and a corresponding driver;
  running, on the network interface, a transmission control protocol (TCP) connection for the application;
  providing, by the driver to the network interface, a series of commands to transmit data from the application by the network interface, wherein a plurality of commands of the series of commands together denote an amount of the data that is less than the amount denoted by one commands of the series of commands;
  providing, by the network interface to the driver, a notification that the one command of the series of commands has been completed by the network interface, and providing, by the network interface to the driver, a single notification that the plurality of commands of the series of commands have been completed by the network interface.

2. The method of claim 1, further comprising setting, at the network interface, a SndUna threshold for the TCP connections, wherein a SndUna value that is greater than or equal to the SndUna threshold initiates one of the notifications.

3. The method of claim 2, wherein the SndUna threshold has a sequence number that is within one sequence number of an ending sequence number of the data denoted by the one command of the series of commands.

4. The method of claim 2, wherein providing the single notification that the plurality of commands of the series of commands have been completed is triggered by receiving, by the network interface, an acknowledgement (ACK) having a sequence number greater than or equal to the SndUna threshold.

5. The method of claim 2, further comprising providing, by the computer to the network interface, the SndUna threshold.

6. The method of claim 2, further comprising calculating, by the computer, the SndUna threshold.

7. The method of claim 1, wherein:
if a second command to send data is not outstanding at the network interface, a SndUna threshold is not provided from the computer to the network interface;
otherwise, if a SndUna threshold is outstanding on the network interface, a second SndUna threshold is not provided from the computer to the network interface; and
otherwise, a SndUna threshold is provided from the computer to the network interface, the SndUna threshold set to an ending sequence number of a first of the series of commands.

8. The method of claim 1, further comprising:
providing, by the computer to the network interface, a SndUna threshold, prior to providing, by the network interface to the computer, a SndUna value that serves as one of the notifications; and
checking, by the computer, that the SndUna value has a sequence number greater than or equal to the SndUna threshold.

9. The method of claim 1, further comprising providing, by the computer to the network interface, a SndUna threshold having a sequence number equal to the ending sequence number of data denoted by a first command of the plurality of commands of the series of commands.

10. The method of claim 1, wherein providing the single notification that the plurality of the commands have been completed is in response to receiving, by the network interface, an acknowledgement (ACK) for all data denoted by the plurality of the commands.

11. The method of claim 1, wherein providing the single notification that the plurality of commands of the series of commands have been completed includes providing, by the network interface to the computer, a SndUna value of the TCP connections.

12. The method of claim 11, further comprising:
checking, by the computer, that the SndUna value has a sequence number greater than or equal to an ending sequence number of the data denoted by a first of the plurality of commands.

13. The method of claim 1, wherein providing the notification that the one command of the series of commands has been completed includes providing, by the network interface to the computer, a SndUna value of the TCP connections.

14. The method of claim 13, further comprising:
checking, by the computer, that the SndUna value has a sequence number greater than or equal to the ending sequence number of the data denoted by the one command.

15. A method comprising:
running an application on a computer having a network interface and a corresponding driver, the application controlling data;
running, on the network interface, a transmission control protocol (TCP) connection for the application, including maintaining a SndUna value for the TCP connection;
providing to the driver a command to send data from the application;
if a second command to send data is not outstanding at the network interface, not providing a SndUna threshold from the driver to the network interface;
otherwise, if a SndUna threshold is outstanding on the network interface, not providing a second SndUna threshold from the driver to the network interface; and
otherwise, providing a SndUna threshold from the computer to the network interface, the SndUna threshold being equal to or one sequence number greater than an ending sequence number of a first command to send data that is outstanding at the network interface.

* * * * *